Sept. 20, 1966
L. J. HAGENSON
3,273,934
FOLDING TRAVEL TRAILER
Filed Jan. 20, 1964
3 Sheets-Sheet 1
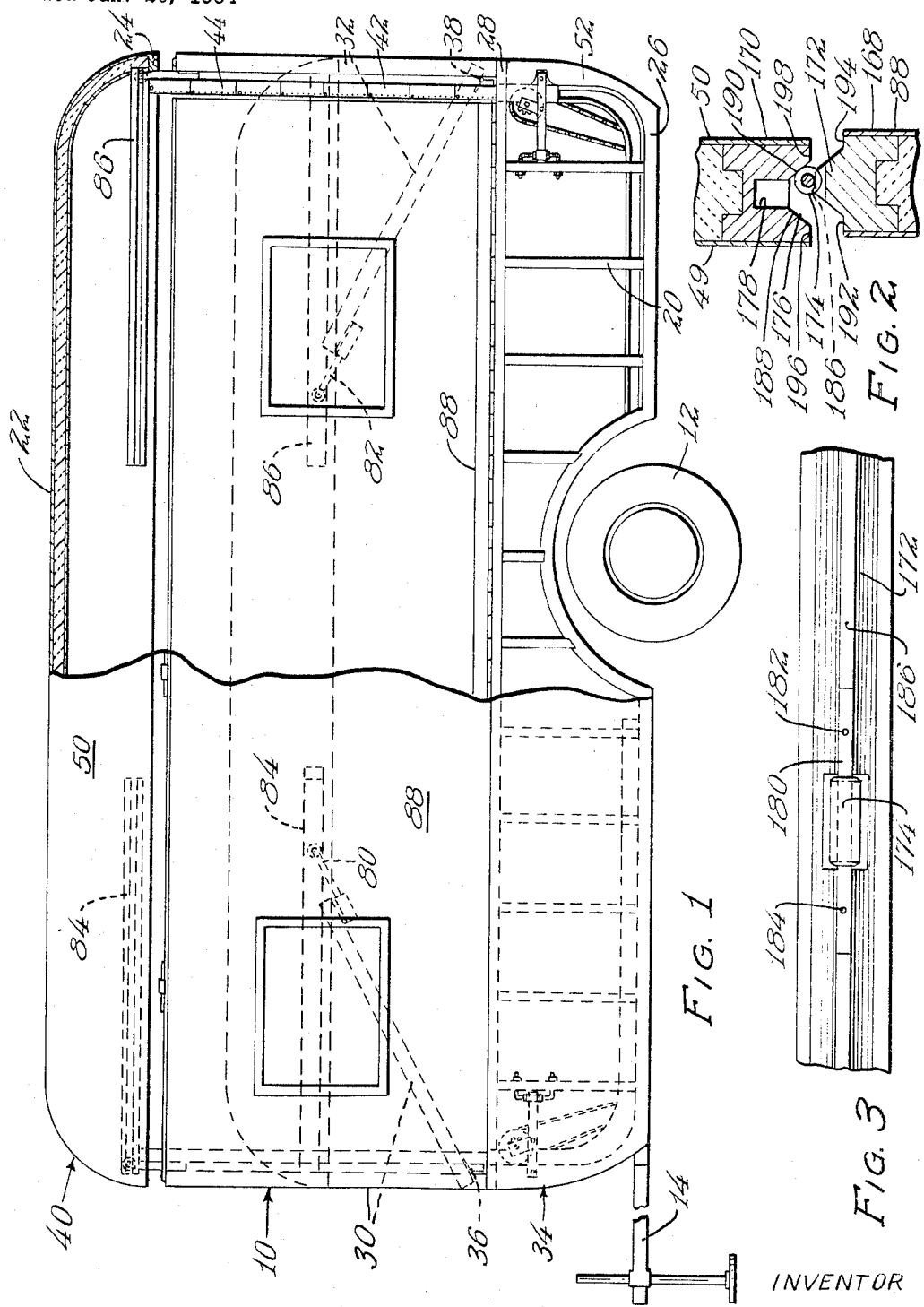
INVENTOR
LEO J. HAGENSON
BY Robert Dunning
ATTORNEY Sept. 20, 1966 L. J. HAGENSON 3,273,934
FOLDING TRAVEL TRAILER
Filed Jan. 20, 1964 3 Sheets-Sheet 2
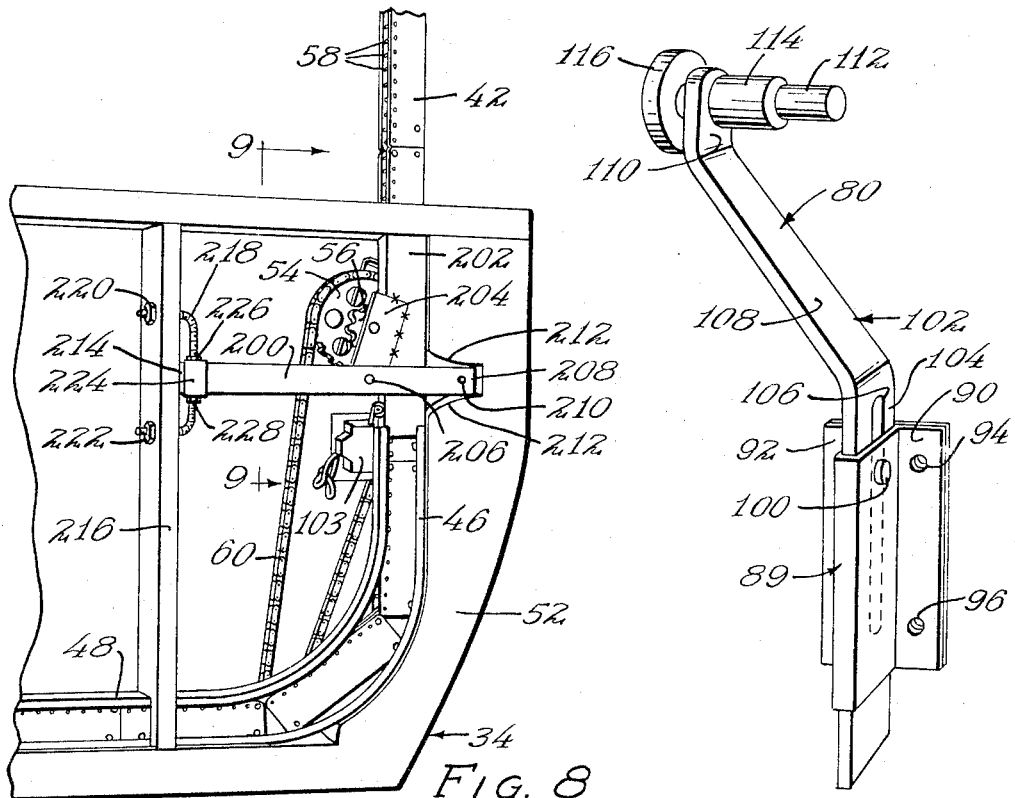
FIG. 8
FIG. 7
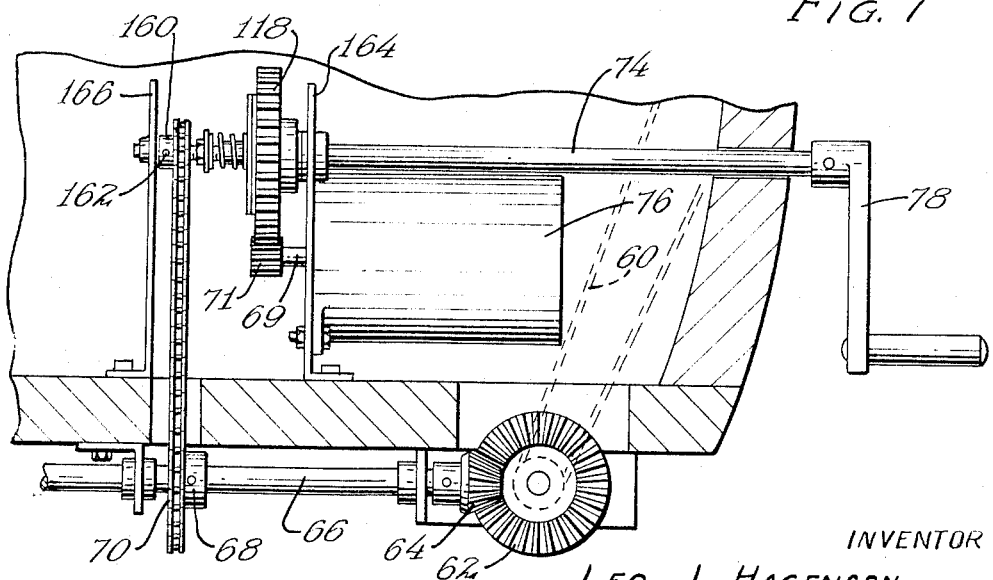
FIG. 4
INVENTOR
LEO J. HAGENSON
BY
ATTORNEY Sept. 20, 1966 L. J. HAGENSON 3,273,934
FOLDING TRAVEL TRAILER
Filed Jan. 20, 1964 3 Sheets-Sheet 3

INVENTOR
LEO J. HAGENSON
BY
ATTORNEY

United States Patent Office 3,273,934
Patented Sept. 20, 1966

3,273,934
FOLDING TRAVEL TRAILER
Leo J. Hagenson, Grantsburg, Wis., assignor to Rolite, Inc., Grantsburg, Wis., a corporation of Wisconsin
Filed Jan. 20, 1964, Ser. No. 338,901
13 Claims. (Cl. 296—26)

This invention relates to a folding travel trailer particularly adopted to be trailed behind an automobile and embodying improved mechanism whereby the trailer is more satisfactory for its intended purpose than trailers previously marketed.

This trailer embodied in my invention while having many of the same features detailed and described in my U.S. Patent 3,024,059, issued March 6, 1962, embodies new features which enable the trailer to be far more mechanically successful.

I have found that one of the difficulties in a collapsible and expanding house trailer having two sections in superimposed relation is the difficulty encountered in having the side walls which are relatively elongated aligned with the edges of the sections. As will be understood the side walls are secured along coplanar horizontal hinge lines to the lower section and may be raised and lowered into desired position. Because of the length of the walls, it is quite conceivable that the walls will tend to warp or bend causing imperfect alignment of the unhinged edge of the wall with the corresponding edge of the upper section. I have found that is uniquely possible to prevent this misalignment by means of a roller secured to a longitudinally extending tongue member intermediate the ends and sides of the end opposite the hinged end of the side wall. In this construction the uppermost section has a cooperable rear section including a more deeply recessed portion registrable with the roller. When the wall is raised into an upstanding position with the tongue engaged in the cooperable groove and the roller registered in the recess of the uppermost section, the wall is in aligned relation with the upper section.

It is an object of the present invention to provide roller means secured to a longitudinally extending tongue along the free end of the side wall opposite the hinged end of the wall cooperable with a groove and recess designed to receive the tongue and roller whereby when the cooperable tongue and groove are in aligned relation, the wall is aligned with the upper section, and where the wall is misaligned with the upper section pressure on the wall in the desired direction will cause the roller to move the wall into alignment.

It has been a problem for a comparatively long period of time to control the raising and lowering of the upper section in relation to the lower section. Part of the difficulty arose from the problem of providing enduring mechanism which would function to raise and lower the upper section, but which could be adjusted to variances in load weight and to be possessed of a safety factor preventing the lower section from being forced beyond desired limits. I have found that a clutch designed to function positively in one direction of rotation and adjustably in the opposite rotation will provide the desired results.

It is an object of the present invention to provide a clutch connected to the driving mechaninm which raises and lowers the upper section of the trailer designed to be adjusted to a particular weight in one direction of rotation, and to be positive in its engagement in the opposite direction of rotation whereby desired results are obtained and damage to the trailer and operating mechanism is prevented.

As disclosed in my U.S. patent I have found that racks formed of a series of rigid links pivotally connected and having ends which abut when the links are in alignment and having spaced teeth on the links which are engaged by sprockets provide a preferred form of support for the upper section when it is in raised position. The racks are designed to telescope into guide members as they are lowered. Some difficulty has been encountered in finding some way in which the engagement of the sprockets with the links could be controlled and adjusted as needed. Particularly, difficulty was found in the necessity of having the sprocket engage the links at a point where the links did not have the supporting and guiding structure of the guide members. I have found that by providing a guide extension in secured relation to the sprockets having means to position the sprockets and guide extension in relation to the guide members overcame the previous difficulty and in addition enabled the more rapid assembly of the racks and the lower section during manufacture.

It is an object of the present invention to provide a guide extension movable in cooperable relation to the link engaging sprocket whereby the operating mechanism may be more readily assembled during manufacture and more readily adjusted when in the assembled state.

When the upper section of the trailer is raised into its desired superimposed position, the end walls may be raised to an upstanding position. It is sometimes difficult to gauge how high the upper section should be raised in order to accommodate the end walls when they are in the upstanding position. The upper section might be raised too high except for a cut-off of power by a microswitch, thereby preventing considerable damage from resulting to the operating mechanism. In some instances the upper section may not be raised far enough in which case the user of the trailer must again resort to raising the upper section. This constitutes a decided disadvantage particularly should the weather be inclement and some speed in placing the trailer in livable condition be necessary. I have found that these difficulties may be overcome due to the use of hanger means secured to the inward side of the end wall, the hanger employing a stationary member and a telescoping member designed to be slidably movable in the receiving or stationary member. A stationary member is secured to the end wall adjacent the corners of the free or unhinged end of the wall. Secured to the uppermost end of the hanger, I have provided a roller designed to be engaged in a longitudinal track secured adjacent the side edges of the upper section. Accordingly when the upper section is raised the telescoping hanger will extend to some degree permitting the ball to be raised readily as the upper section is raised. When the upper section is raised to the desired height, the end wall may be pushed to its upstanding position in the event this position has not already been reached. Should the upper section be raised above the height necessary to accommodate the upstanding wall, no damage occurs because of the extendable telescoping portion of the hanger. In the event that the upper section would continue to be raised, the telescoping member would stop this raising movement due to a stop preventing extension of the telescoping member beyond a certain point. At this point as has been previously indicated the microswitch mechanism would cause the necessary stoppage to prevent damage to the trailer construction.

Accordingly, it is an object of the present invention to provide a hanger means designed to raise the end walls into position and to prevent the upper section of the trailer from being raised to a height which would be damaging to the operating mechanism or to the trailer structure itself.

These and other objects and particular advantages will be more particularly detailed and described in the accompanying specification taken in connection with the drawings herein in which:

FIGURE 1 is a side elevation of the trailer illustrating the movably superimposed relation of the top and bottom section to each other and the movement of the end walls in relation to the uppermost section.

FIGURE 2 is a view in section illustrating the relation between the free end edge of the side wall having the longitudinally extending tongue with a roller means extending therefrom designed to be engaged in a cooperable longitudinally grooved section and recess in the upper section.

FIGURE 3 is a top plan view of a section of the longitudinally extending tongue with the roller secured thereto.

FIGURE 4 is a view in plan of a portion of the trailer showing the relation of the clutch to other portions of the operating mechanism.

FIGURE 7 is an enlarged view of the hanger mechanism particularly showing the angularly offset roller end, the telescoping relation of the fixed and slidably movable parts, and the stop mechanism.

FIGURE 8 is a side elevation showing the relation of the sprocket and guide extension in cooperable relation with the positioning means with the outside wall removed.

Figure 5:
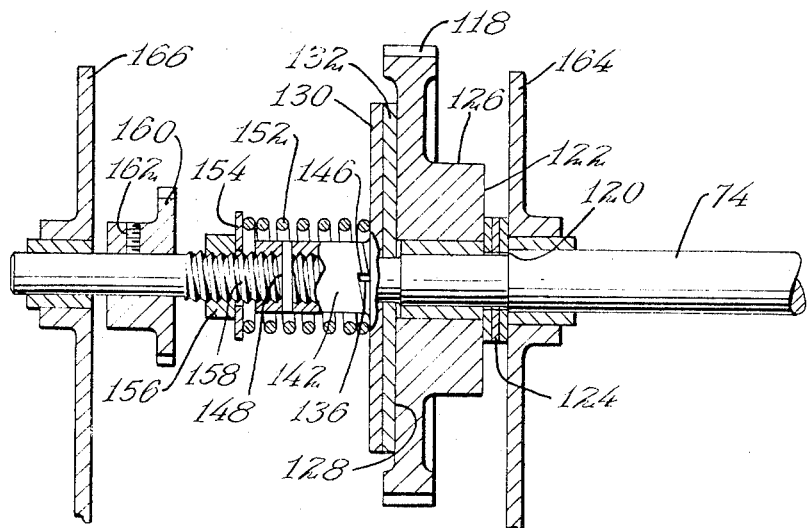
FIGURE 5 is a detail view of the clutch mechanism.

As will be clear from the drawings and from the teachings of my previous U.S. Patent 3,024,059 issued March 6, 1962, I have provided a folding travel trailer generally numbered 10 designed to roll on a pair of wheels such as 12 and to be towed behind a vehicle (which is not shown) by means of a tow bar 14 and suitable connecting hitch. The trailer is designed to be towed in a compact folded position during travel and to be unfolded or raised into position to serve as a camp residence. The trailer has a pair of upper and lower sections generally numbered 34 and 40 respectively in superimposed edge abutting relation. Suitable frame and structural members such as the ribs are provided. Longitudinal extending frame members such as 22 and 24 of the upper section and 26 and 28 of the lower section are provided, the members 24 and 28 being designed to be in edge abutting relation when the trailer is folded or compacted and to provide the sill edge against which the side and end walls which will be further described edgably abut when in upstanding relation.

As will be understood the outer portion of the trailer may be covered with any desired material such as aluminum, wood, fibre glass and the like without departing from my purpose.

As has been described in my previous patent, the trailer has a pair of opposed end walls 30 and 32 which are illustrated and opposed side walls which are not illustrated in full because of their description in the previous patent application. Instead, I have merely shown the edge of one of the side walls as in FIGURES 2 and 3 to illustrate the particular improvement in the present application.

As previously indicated the trailer is somewhat elongated and accordingly the side walls are of a length of somewhat approximating twelve feet whereas the end walls are approximately seven feet wide. The dimensions given in the preferred construction are however not intended to be limiting as to the trailer size, but are merely for the purposes of providing a frame of reference so that the operation of the various parts to be described may be more fully understood. The end walls 30 and 32 are secured to the bottom section 34 of the trailer by longitudinally extending co-planar hinges 36 and 38 which may be of any desired length but in preferred construction are of the piano hinge type. The end walls are designed to be movable from a lying down generally horizontal position to a generally vertical upstanding position when the upper section has been raised into position.

As may be clearly seen in FIGURE 1 the upper section 40 shown in the partially raised position and an extended or fully raised position is secured to the end walls along the free end of the walls opposite the hinged end for a purpose which will be more fully described. The side walls are similarly hinged along horizontally extending coplanar hinges and are designed to be raised from a lowered generally horizontal position to a generally vertical upstanding position as in the case of the end walls. The upper section 40 is designed to be moved toward and away from the bottom section 34 by supporting means designed to be extended and retracted as the upper section is raised and lowered in relation to the lower section. In the preferred construction, I provide racks formed of a series of connected support members such as 42 and 44 which are designed to telescope into guide members 46 and 48 which are positioned between side walls in the bottom section 34 as 49 and 50 with the lower end of the racks disposed between inner and outer walls of the lower section 34 as has been more particularly set out in my previous patent. The guide channel members such as 46 and 48 extend horizontally to the intermediate portion of the body secured to the framing member 52 in any suitable manner.

It will be understood that the construction is similar on both sides of the trailer and in view of the fact that the description has been more detailed in my previous patent, further detailed description is not felt necessary at this point.

Four racks or support members are provided in the preferred construction with each rack actuated by a double sprocket 54 having a smaller sprocket 56 which meshes with the teeth 58 of the links 42 to raise and lower the racks. The sprockets are suitably mounted on shafts in a manner which will be more fully described.

As has been described in my previous patent transverse shafts operably connected and driven by beveled gears engage link chains such as 60 to drive sprockets. An illustration of the geared connection may be seen in FIGURE 4 where gears 62 and 64 drive a shaft 66 having a sprocket 68 connected to a chain 70 connected to a clutch generally numbered 72 actuated by a shaft 74 designed to be driven by a motor 76 or a hand crank 78. As has been described in my previous patent the motor may be actuated by an exterior switch not shown.

Since other details of the construction of the trailer have been previously described in my previous patent, further detailed description is believed unnecessary and will not be attempted except in connection with the improvements of the subject of this invention.

Reviewing momentarily the operation in the interest of clarity, assuming that the trailer is in a folded or collapsed position, the user actuates the electric motor or other actuating means causing the shaft 74 to rotate in a preselected direction of rotation thereby serving to actuate the clutch in the desired direction of rotation and in turn the drive chain 70 serving to drive the sprocket 68 connecting shaft 66 and the gear members 64 and 62 and connecting shaft not shown to drive the support members at the corners of the trailer. The support members such as the racks 42 and 44 will be urged upwards thereby raising the upper section 40 in spaced relation from the lower section 34. The end walls 30 and 32 having hangers 80 and 82 engaged in longitudinally extending tracks such as 84 and 86 adjacent the opposed side walls of the upper section will be urged upwards thereby raising simultaneously with the upper section from a collapsed horizontal position to a vertical position to form the end walls of the trailer house. The side walls such as 88 may then be normally raised and aligned in a vertical position to form side walls of the trailer. Obviously, the procedure is reversed in collapsing the house trailer. In addition, locking members to hold the upright walls in locked relation to the upper and lower sections of any desired type may be provided.

Turning to the illustration of FIGURE 7 the hanger means is clearly illustrated. The hanger comprises a receiving member 89 of a generally hollow rectangular outline having fastening flanges 90 and 92 projecting outwardly from the receiving member having suitable apertures such as 94 and 96 through which screws or other fastening members may be used to attach the receiving member to the end wall. Preferably I have found that the hanger means should be provided with at least a pair for each end wall. The hangers are preferably placed adjacent the upper corner on the inner side of the wall when upstanding although obviously other positions could be utilized as will be obvious from the structure described.

An elongated slot extending generally vertically is provided intermediate the sides and ends of a telescoping member to accommodate the stop member 100 of the receiving member 89. The slidably telescoping member 102 designed to be received within the confines of the receiving member comprises a sliding portion 104 having an elongated slot 106 through which the stop member 100, for example a rivet, is positioned.

As is apparent from the view of FIGURE 7 the telescoping and extending movement of the sliding member 104 is limited by the length of the slot 106 through engagement of the stop 100 against a slot end. Extending angularly outwardly from the sliding member 104 an arm extension is provided numbered 108. An end extremity 110 extending generally parallel to the sliding member 104 has an aperture therethrough through which a shaft 112 extends, the shaft being enclosed by a sleeve 114 secured in the aperture in the end extremity 110 and having a roller 116 secured to its outer end designed to engage in rollable engagement in a track member such as 84 and 86. Any suitable locking means such as a clip may be provided to hold the shaft 112 secured in rotatable relation within the sleeve 114. On the other hand, since the hanger is secured in a fixed position lateral movement of the shaft and roller in engagement with the track is quite limited. Turning to the tracks such as 84 or 86, their description is believed quite obvious but in general they may be described as a channel having an elongated longitudinal slot adapted to receive the roller 116 and portions of the shank 112 to enable the roller to move longitudinally as the end wall is raised and lowered in connection with the upper section. As has been previously pointed out, the track means such as 84 extends longitudinally of the trailer, and in preferred position is secured adjacent to the side wall of the upper section. Accordingly, as the upper section is raised, the end walls are raised simultaneously by the hangers rollably engaged in the tracks. When the upper section is fully raised the end wall may be pushed into an upright position if it has not already reached that position. A particular advantage of the construction is that the upper section may be raised to a height to accommodate the end and side walls readily without any danger of injuring the walls or the operating mechanism because of the extendable feature of the hanger such as 80 shown in FIGURE 7. In the event that the upper section is raised indiscriminantly the stop 100 prevents the sliding member 104 from proceeding out of its panel in the receiving member. At this point a microswitch 103 shown in FIGURE 8 operates to prevent further activation of the raising mechanism. Once the walls are in the desired upright position, the upper section may be lowered, and as the lowering of the upper section takes place the hanger telescopes slidably into the receiving member.

While I have found that the angled extension is preferred it is of course obvious that by moving the track channels inwardly from the side edges of the upper section, a slidable telescoping hanger without the angled member could be provided. It is readily apparent that the hanger serves to raise the walls into position and in addition serves to provide a safety factor preventing damage to the walls or to the trailer. Any desired type of roller construction may be employed and such is believed obvious and will not be described.

Figure 6:
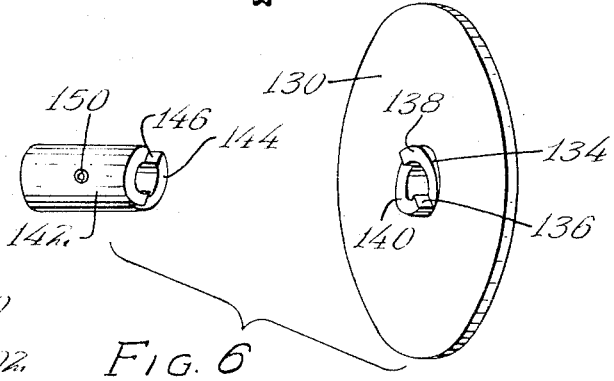
FIGURE 6 is an exploded view illustrating the engageable ends of the sleeve and collar designed to permit positive or adjustable engagement of the clutch depending on the rotation direction.
Figure 9:
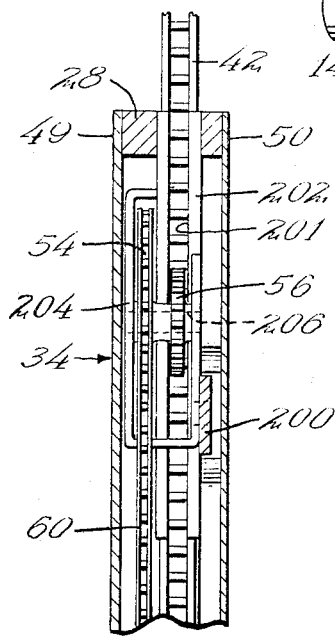
FIGURE 9 is a section taken along the lines 9—9 of FIGURE 8.
Figure 10:
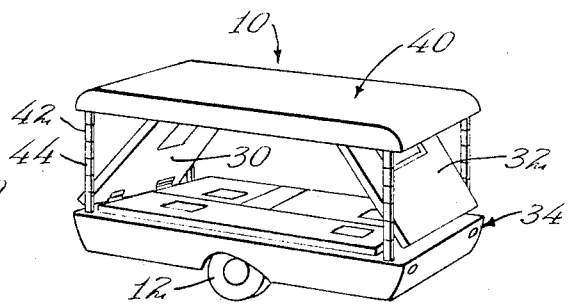
FIGURE 10 is a general view showing the relation of the partially elevated end walls to the roof section and the horizontal side walls.

Turning now to the clutch assembly shown in FIGURES 4, 5, and 6 it is apparent that the clutch assembly serves a unique purpose in my trailer structure. As previously indicated severe damage to the trailer could result in the event that the upper section was raised beyond its desired height. I have found that the particular construction which I show will satisfactorily perform the desired function of a clutch and at the same time provide means of preventing possible damage to the trailer or operating mechanism. As may be best seen in FIGURE 5, the clutch is turned by a rotatable shaft 74 engaged to a motor or other actuating means. The shaft 74 is rotatable in either direction. The clutch means includes a rotatable gear means 118 having a central aperture therethrough and in the preferred construction having teeth extending perpendicular to the circumference of the gear. The portion of the shaft 74 on which the gear 118 rotates in preferred construction is of slightly reduced diameter so as to provide a shoulder 120 against which a bearing face 122 of the gear 118 may rotate. Spacing washers 124 may be provided to take up space between the bearing face 122 and the shoulder 120 as well as to provide a bearing surface preventing wear of the bearing face and shoulder. In the preferred construction shown the bearing face 122 is provided on the end of a collar 126 integral with the one face of the gear 118. The other face of the gear provides a bearing surface 128 designed to be engaged by a pressure plate 130. A suitable friction member 132 may be provided between the plate 130 and the bearing face 128 to increase frictional engagement between the two members and to absorb wear.

The other side of the pressure plate has an integral collar portion protruding therefrom designed to encircle the shaft 74, the collar portion being generally numbered 134. As may be clearly seen in FIGURE 6, the protruding collar portion end furthest from the plate is a spirally inclined plane having a squared end surface 136 generally perpendicular to the shaft 74 in mounted relation. In preferred construction I provide a pair of spirally inclined planes 138 and 140 for obvious reasons. To engage the collar portion 134, I provide a generally cylindrical sleeve 142 having an oppositely spiral inclined plane end 144 including a square end 146 oppositely engageable against one of the squared ends of the collar. As may be seen in the cut away portion of the sleeve in FIGURE 5 the portion of the shaft 74 encircled by the sleeve may be threaded so as to enable the sleeve to be brought into desired position in relation to the collar. An annular groove 148 is provided in the shaft 74 designed to receive a set screw 150 to hold the sleeve from movement back and forth on the shaft. At this point it will be obvious that when the shaft 74 is rotated in one direction the opposed spirally inclined planes will frictionally wedge against one another to provide a positive pressure against the clutch plate and against the face of the gear resulting in positive rotation. To permit an adjustable relation of the clutch when turning in the other direction I provide a spring 152 encircling the sleeve 142 and having an end of the spring in contact with the pressure plate 130. To control the compression of the spring against the pressure plate 130 I provide compression means in the form of a plate 154 and a tension lock such as a nut 156 which is internally threaded and designed to be screwed on the thread 158 of the shaft 74 so as to compress the spring 152 against the pressure plate 130 to any desired amount of pressure. By this clutch I provide a means of adjusting the engagement of the pressure plate against the bearing face of the gear to correspond to the load I desire to handle. In other words, if the upper section were to comprise a specified weight it would be merely necessary to compress the spring against the plate so as to enable the clutch to operate readily with that amount of weight and to slip in the event that an undue amount of weight were provided. By this method, I enable the clutch to be used as a safety factor in preventing the roof or upper section from being lowered beyond desired limits since the clutch was slipped because of the adjustable feature. On the contrary, because of the positive feature the clutch will serve to raise the upper section positively through the wedging action of the planes. In other words, I have found by my clutch that one of the most annoying problems of compact trailers has been eliminated. It will be apparent by controlling the tension on the spring undesired slippage may be eliminated. It will be further apparent from the description of the operating shaft and gearing described in my previous patent that the clutch will serve to actuate and operate the corner support members into raised or lowered position with equal facility.

The inter-relationship of the clutch to the hanger which has been previously indicated should at this point be readily apparent.

Turning once again to FIGURE 4 as may be seen the handle 78 can rotate the shaft 74 in order to operate the clutch and operating mechanism, or in the alternative the motor 76 by means of a shaft 69 and a gear 71 may drive the tooth gear 118 in rotation. On the shaft 74 adjacent the threaded portion I provide a sprocket 160 secured in place by a set screw 162 on the shaft which engages the chain 70. Supporting members 164 and 166 are provided to hold the motor and clutch in desired position within the framework of the bottom of the trailer, supporting plates 164 and 166 being held in position by any desired means such as bolts.

Turning now to the views of FIGURES 2 and 3 these show in detail the engagement of the side walls of the trailer with the upper section 40. As pointed out in my previous patent, the upper section 40 has opposed side walls including coplanar framing members which form the lower edges of the upper section such as 24. Since the side walls are relatively elongated and tend to flex to some extent it is desirable that some means of alignment of the end walls with the upper section be effected. I provide as may be seen in FIGURES 2 and 3 a tongue and groove relationship between the side walls and the upper section. As has been indicated the opposed side walls are hingedly secured along coplanar horizontal parallel axes to the lower section 34 by a suitable hinge extending longitudinally of the trailer. As has been previously indicated each side wall is pivotally movable from a generally horizontal lying down position to an upstanding generally vertical position with the end edges of the side wall opposite the hinged end of the side walls adapted to align in corresponding relation to the downwardly facing edges of the opposed sides of the upper section. As may be seen in FIGURE 2 each of the side wall end edges such as 168 is adapted to be engaged by a corresponding portion 170 of the upper section. The side wall edge 168 includes a longitudinally upstanding tongue 172 which extends substantially from end to end of the said wall and having a roller means 174 which may be of any desired length extending above the upper edge of the tongue. The corresponding portion of the upper section 170 includes a groove extending substantially from end to end of the side wall of the upper section adapted to receive the tongue 172, the groove being generally indicated by the number 176 and including a recess 178 registrable with the roller 174 when the side wall 88 is aligned with the side wall 50 of the upper section 40. The roller 174 as may be seen in FIGURE 3 is mounted upon a shaft 180 secured to the upper portion of the tongue 172 by fastening means 182 and 184 such as nails or screws. As may be seen in FIGURE 2, in the event that the side wall 88 is not properly aligned with the upper section side wall 50, a corrective push against the wall will cause the side wall 88 to roll into aligned relation. Because of the relatively great length of the side walls such as 88 of the trailer, the obvious advantage of being able to rollably move the side walls into alignment with the corresponding portion of the upper section is apparent.

Examining the structure shown in FIGURE 2 more closely, in the preferred construction I provide a tongue intermediate the side edges of the side wall of a generally triangular shape having a flattened apex 186 to which the roller 174 is secured through the roller shaft 180. The corresponding grooved portion 176 of the upper section has side walls 188 and 190 which are inwardly sloped to provide a close fitting engagement with the tongue 172. The edge portions adjacent the tongue 192 and 194 and the corresponding portions of the upper section 196 and 198 are relatively flat so that when the side wall is aligned with the upper section, the side wall is not only in alignment with the upper section but a water tight joint is provided as well. In the preferred construction of the abutting portions of the side wall and upper section, I use a tongue and groove construction as may be clearly seen, but other obvious methods of providing the desired structure would be satisfactory as well.

Turning to FIGURE 8 the sprocket tube assembly adjustment arm 200 is shown pivotally secured to the sprocket assemly 54, 56 and the guide extension 202. In the preferred construction shown the guide extension 202 is an elongated generally hollow rectangle designed to permit the rack such as 42 to move upwardly and downwardly within the guide extension 202 in engagement with the sprocket 56. The sprockets as has been indicated previously are driven by a chain such as 60 to previously described shafting and sprocket by the motor or crank handle. The rack engaging sprocket 56 has teeth which engage the teeth 58 of the links forming the rack through a slot 201 in the guide extension 202. The sprockets 54 and 56 are secured to the guide extension 202 by a bracket 204 which is secured in any suitable manner such as by welding for example. The arm 200 is pivotally secured to the bracket 204 by means of a pivot post 206 such as a rivet. The elongated arm 200 is secured at one end 208 to a framing member such as 52 in any suitable manner such as by a bolt 210. As is apparent, the arm 200 is enabled to pivot about the bolt 210 by having the portions of the framing member 52 outwardly sloped as indicated at 212 to provide sufficient clearance for the arm to be secured to a desired extent. The other end of the arm 214 is secured in adjustable relation to a stud 216 by means of a U-shaped bolt 218 which is threaded and extends through the stud to be secured by fastening means 220 and 222. A U-shaped clip 224 having registrable apertures through the parallel end portions of the clip is secured on the threaded bolt 218 where it may be moved upwardly or downwardly on the bolt to thereby cause a corresponding pivotal relation of the arm in the sprockets and guide extension secured to the arm. The clip 224 is held in the desired position by casting means 226 and 228.

In assembling the racks in the lower section 34 it has been a problem to properly adjust the chains and sprockets in position relation to the links of the rack. By my preferred construction which I now disclose the arm 200 may be pivoted so as to extend in parallel relation to the guide extension so as to permit the entire assembly to be readily inserted into the lower section of the trailer. When the assembly is in the generally correct relation to the links, the arm 200 is pivoted into desired position and secured by the bolt 210 and the bolt 218 in engagement with the chain 60 and the links. Necessary adjustment of the chain tension is made by adjustment of the clip 224 which pivots the sprockets in relation to the links and the chains to the position desired. As is apparent movement of the arm 200 causes corresponding movement of the guide extension 202 upwardly and downwardly in relation to the guide members serving to guide the link members of the rack into telescoped position in the face of the lower section 34.

As should be clearly evident the described improvements in my trailer function together not only for ease of maintenance but also for safety and efficiency. The sprocket tube assembly with its adjusting arm enables constant guiding of the rack in relation to the sprocket and corresponding proper tensioning of the driving chain as well as ease of assemblage of the guide member handling mechanism. The clutch which serves to drive the sprockets engaged in the rack and the hangers and tongue and groove portions of the side walls and upper section function together to enable the walls of the trailer to be moved into desired position when the upper section is raised and to properly align the walls with the upper section. While it is apparent that I have set forth the best embodiment of my invention I recognize that others may substitute the equivalent parts which I have not described because of their obviousness.

Accordingly, while I have described the best embodiments of my invention I desire to have it understood that obvious changes may be made within the scope of the accompanying claims without departing from the spirit of my invention.

I claim:

1. A collapsible and expandable house trailer having two sections in superimposed edge abutting relation,
   (a) telescoping support means secured opposedly between said sections to hold said sections in spaced apart relations,
   (b) means engageable with said first means to move said sections toward and away from each other,
   (c) a pair of opposed end walls and side walls hingedly secured about coplanar oppositely parallel horizontal axes to the lower said section,
   (d) means pivotally and rollably securing said end walls to said upper section whereby said walls are adapted to move toward and away from said lower section in correspondence with similar movement of said upper section,
   (e) each said wall movable from a generally horizontal lying position to an upstanding generally vertical position,
   (f) upper ends of said upstanding side walls and opposed portions of said upper section having cooperable aligning means including longitudinally extending tongue and groove members extending substantially from end to end of said side walls and opposed portions adapted to cooperate,
   (g) said tongue members being adapted to reside within said groove of said groove members when the upper ends of said side walls abut in alignment with corresponding portions of said upper sections, said side walls and corresponding upper sections being aligned thereby and in which said telescoping means secured opposedly between said sections include racks formed of a series of rigid links pivotally connected and having ends which abut when the links are in alignment and having spaced teeth on said links, said tongue members extending longitudinally of the ends of said side walls.

2. An elongated collapsible and expandable house trailer having two sections enclosed by side and end panels in opposed edge abutting relation,
   (a) means secured between said sections to hold said sections in movably spaced apart relation,
   (b) a pair of opposed side walls having one end of each side wall hingedly secured along coplanar horizontal parallel axes to one said section,
   (c) each said side wall pivotally movable from a generally horizontal lying down position to an upstanding generally vertical position with the end opposite said hinged end of said side walls in aligned opposed relation to corresponding portions of said side section panels,
   (d) each said opposite side wall end including at least one roller means,
   (e) at least a part of said roller means disposed above the end surface of each said side wall end and adapted to rollably engage against said corresponding portion of the side upper section panels when said side walls are moved into alignment with said side section panels,
   (f) said opposed portions of said upper section including recesses registrable with said roller means,
   (g) whereby said walls and side panels of said sections are aligned when the said roller means are registered in said recesses of said upper sections.

3. The structure of claim 2 and in which said opposite wall ends include a longitudinally upstanding tongue intermediate the side edges of each side wall end, said tongue extending at least substantially from end to end of each said side wall, said corresponding portions of said upper section having a longitudinally extending groove adapted to receive said tongue, said roller means extending at least partially beyond the outer edge of said tongue.

4. The structure of claim 2 and in which said roller means extends longitudinally of said side wall end.

5. An elongated collapsible and expandable house trailer having two sections in superimposed edge abutting relation,
   (a) means secured between said sections to hold said sections in movably spaced apart relation,
   (b) a pair of opposed generally rectangular end walls hingedly secured at one end of said walls along coplanar horizontal parallel axes to the lower said section,
   (c) hanger means secured adjacent the free opposed edge of said walls,
   (d) said hanger means having a receiving member and a telescoping member slidable in said receiving member and at least partially telescoped into said receiving member, said telescoping member having a non-telescoped portion in angled relation to said receiving member,
   (e) track means extending longitudinally of said uppermost section,
   (f) the end of each said movable telescoping member furthest from said free edge of said walls having a track engaging member secured thereto,
   (g) each said track engaging member engaged in pivotally secured, longitudinally movable relation with said track means,
   (h) whereby when said sections are moved toward or away from each other, said walls are raised and lowered.

6. The structure of claim 5 and in which said track means includes a channel means, said track engaging member including roller means engaged in said channel means.

7. The structure of claim 5 and in which said receiving member is secured in fixed relation adjacent the corner edges of said free edge.

8. The structure of claim 7 and in which said telescoping member slidably is of sufficient length whereby said uppermost superimposed section is adapted to be raised in spaced above relation to said free ends of said walls when said walls are upstanding, said receiving member having a stop means to limit slidable extension of said telescoping member.

9. The structure of claim 6 and in which said track extends adjacent the longitudinal side edges of said upper section, said track engaging member being at substantially right angled relation to said telescoping member whereby said engaging member is adapted to engage said track.

10. A collapsible and expandable house trailer having upper and lower sections in superimposed edge abutting relation,
(a) racks formed of a series of connected support members whereby said sections may be abutted in parallel relation or may be held in superimposed spaced parallel relation including a clutch means,
(b) said clutch means including a driven shaft,
(c) a rotatable gear means having opposed face surfaces on said shaft,
(d) means drivingly connecting said gear means with said support members,
(e) a pressure plate cooperable with said gear means rotatably mounted on said shaft having one side of said plate frictionally engaged by a face surface of said gear means, the other side of said plate having a protecting collar portion encircling said shaft,
(f) the end of said collar portion furthest from said plate comprising at least one spirally inclined plane having a squared end surface generally perpendicular to said shaft,
(g) a cylindrical sleeve on said shaft having an oppositely spiralled inclined plane end having a squared end oppositely engageable against said squared end of said collar inclined plane,
(h) compression spring means loosely encircling said sleeve and collar having one end of said spring means in engagement with said other side of said pressure plate,
(i) compression means at the other end of said spring to urge said spring against said plate and said gear means whereby rotation of said shaft in one direction of rotation causes said opposed ends to meet to rotate said pressure plate in spring pressured engagement with said gear means in the direction of rotation of said shaft, and
(j) whereby when said shaft is rotated in the opposite direction, said inclined surface of said sleeve is rotated into wedging relation against said inclined plane surface of said collar whereby said plate causes said gear means to rotate in said opposite direction.

11. The structure of claim 10 and in which said means frictionally engaging said plate and said gear includes a resilient cylindrical friction member between said plate and said gear.

12. A collapsible and expanding house trailer having two sections in superimposed relation,
(a) racks secured between said sections and in opposed relation,
(b) said racks formed of a series of rigid links pivotally connected and having ends which abut when the links are in alignment and having spaced teeth on said links,
(c) sprockets engaging the teeth of said racks,
(d) arcuate guide members in one section having horizontal and vertical portions for guiding said racks from a horizontal inactive position to a vertical operable position to effect said alignment of links to move said racks relative to said guide members,
(e) a generally vertical guide extension means in said one section alignable in registrable relation with the end of said vertical portion of said guide members and movable toward and away from said guide members,
(f) means positioning said sprockets and guide extension relative to said guide members whereby said guide extension and said sprockets are movable in cooperable relation to said guide members and said racks to effect alignment of said links with said sprockets and said guide extension, and
(g) means for operating said sprockets whereby said sections may be abutted in parallel relation or may be held in superimposed spaced parallel relation.

13. The structure of claim 12 and in which said sprockets are in secured relation to said guide extension, positioning means including a lever arm pivotally secured to said sprockets and at one end to said one section, and means at the other end of said arm adjustably positioning said arm whereby movement of said arm moves said sprocket and guide extension toward and away from said guide member.

References Cited by the Examiner

UNITED STATES PATENTS

| | | | |
|---|---|---|---|
| 2,853,338 | 9/1958 | Stanley | 296—23 |
| 2,862,253 | 12/1958 | Place. | |
| 3,024,059 | 3/1962 | Hagenson | 296—23 |

FOREIGN PATENTS 80,139   10/1955   Denmark.

BENJAMIN HERSH, *Primary Examiner.*

P. GOODMAN, *Assistant Examiner.*